(12) United States Patent
Zhang et al.

(10) Patent No.: US 8,297,088 B1
(45) Date of Patent: Oct. 30, 2012

(54) ELECTRONIC DEVICE ENCLOSURE

(75) Inventors: Guang-Yi Zhang, Shenzhen (CN); Jia-Qi Fu, Shenzhen (CN); Pu-Yu Yao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 56 days.

(21) Appl. No.: 13/107,955

(22) Filed: May 15, 2011

(30) Foreign Application Priority Data

Apr. 12, 2011 (CN) .......................... 2011 1 0090479

(51) Int. Cl.
*E05B 73/00* (2006.01)

(52) U.S. Cl. ........... 70/58; 70/63; 70/78; 70/83; 70/159; 70/164; 70/166; 292/150; 292/153; 312/223.2; 361/679.57; 361/679.58

(58) Field of Classification Search ...... 70/58, 158–173, 70/63, 77, 78, 81, 83, DIG. 79; 292/150, 292/153; 312/223.2; 361/679.57, 679.58, 361/726, 727
See application file for complete search history.

(56) References Cited

U.S. PATENT DOCUMENTS

| | | | | |
|---|---|---|---|---|
| 1,594,650 A * | 8/1926 | Vance | .......................... | 292/218 |
| 1,892,447 A * | 12/1932 | Carr et al. | ........................ | 70/81 |
| 1,932,468 A * | 10/1933 | Knell | ................................ | 70/81 |
| 5,987,937 A * | 11/1999 | Lee | .................................... | 70/14 |
| 6,088,229 A * | 7/2000 | Seto et al. | .................... | 361/726 |
| 6,275,378 B1 * | 8/2001 | Lee et al. | ................ | 361/679.55 |
| 6,697,252 B2 * | 2/2004 | Maeda | .................... | 361/679.41 |
| 6,905,024 B1 * | 6/2005 | Cao et al. | ....................... | 206/461 |
| 7,152,440 B1 * | 12/2006 | Austin | .............................. | 70/58 |
| 7,152,443 B2 * | 12/2006 | Chang et al. | ................... | 70/352 |
| 7,428,835 B2 * | 9/2008 | Fan et al. | ........................ | 70/358 |
| 7,669,443 B2 * | 3/2010 | Varner | .............................. | 70/58 |
| 7,971,458 B2 * | 7/2011 | Gilbert | ............................. | 70/58 |
| 2011/0005281 A1 * | 1/2011 | Lin | .................................... | 70/58 |
| 2011/0058331 A1 * | 3/2011 | Mesfin et al. | ............. | 361/679.57 |

* cited by examiner

*Primary Examiner* — Lloyd Gall
(74) *Attorney, Agent, or Firm* — Altis Law Group, Inc.

(57) ABSTRACT

An enclosure includes a main body, a cover for covering the main body, a movable member movably attached to an inner surface of the main body, and a latch member. The main body defines a through hole. The cover defines a through hole aligning with the through hole of the main body. The movable member defines a locking hole. The locking hole includes a small part and a large part communicating with the small part. The movable member is moved to align the large part of the locking hole with the through hole of the second sidewall. The latch member extends through the through hole of the cover, the through hole of the second sidewall, and the large part of the locking hole. The movable member then is restored, thereby the latch portion engaging in the small part of the locking hole.

15 Claims, 6 Drawing Sheets

ELECTRONIC DEVICE ENCLOSURE

BACKGROUND

1. Technical Field

The disclosure relates to an enclosure of an electronic device.

2. Description of Related Art

An enclosure, such as an enclosure of a server, may include a main body, a cover, and a locking apparatus for locking the cover to the main body. To ensure safe transport and prevent accidental separation of the cover from the main body, the locking apparatus is configured to only be unlocked with the use of a tool. However, using a tool, such as a screwdriver, to rotate the locking apparatus to open the cover during repair and maintenance of the server is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
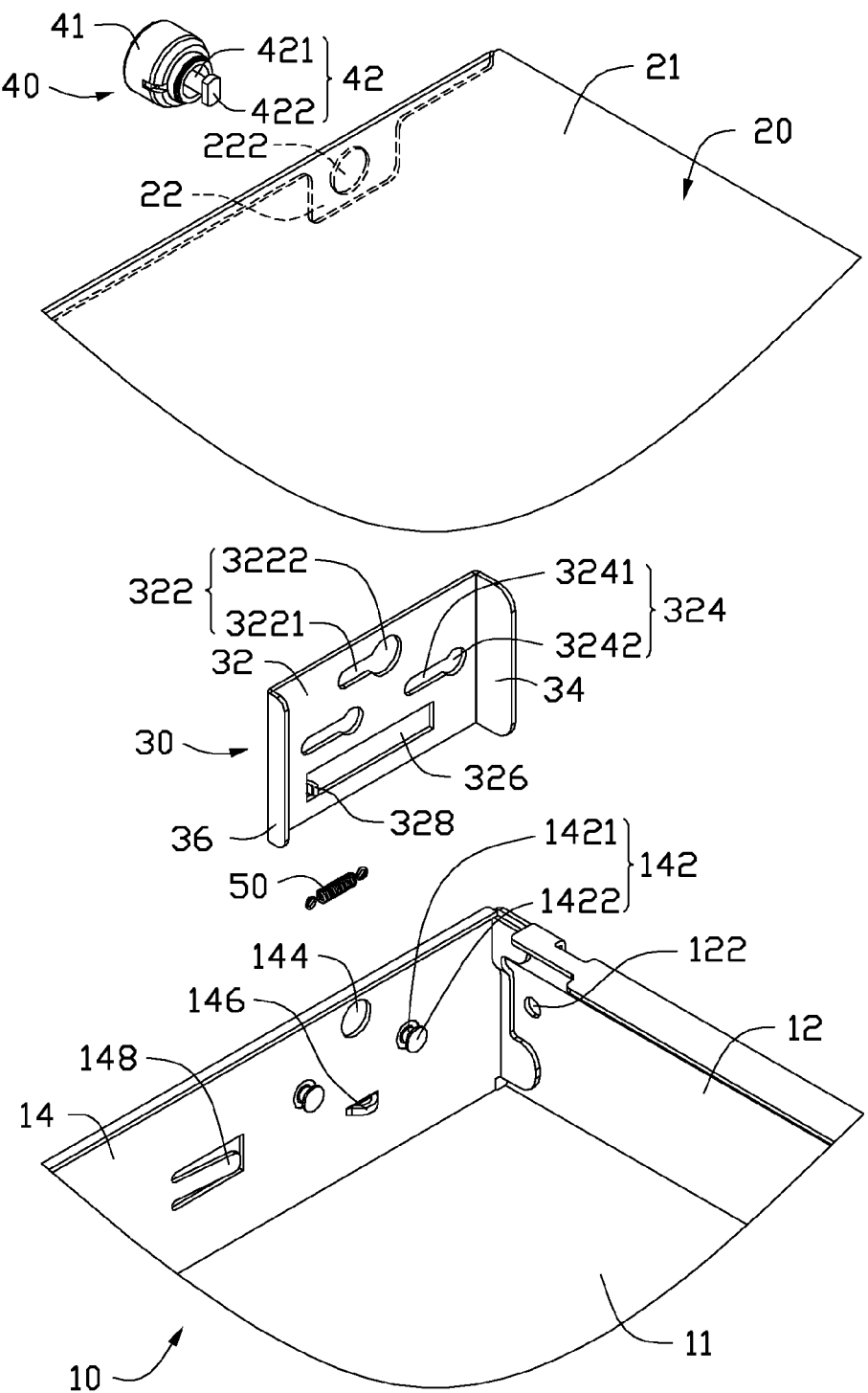
FIG. 1 is an exploded, isometric view of an exemplary embodiment of an enclosure, the enclosure including a latch member.

Referring to FIG. 1, an exemplary embodiment of an enclosure includes a main body 10, a cover 20, a movable member 30, a latch member 40, and a resilient member 50.

The main body 10 includes a bottom plate 11, a first sidewall 12 and a second sidewall 14 extending perpendicularly from two adjacent sides of the main body 10 respectively. A through hole 122 is defined in the first sidewall 12, adjacent to the second sidewall 14. Two T-shaped limiting portions 142 protrude from an inner surface of the second sidewall 14. Each limiting portion 142 includes a neck portion 1421 and a head portion 1422 formed on a distal end of the neck portion 1421. A through hole 144 is defined in second sidewall 14, above the limiting portions 142. A raised portion 146 is formed on the inner surface of the second sidewall 14, below the through hole 144. The second sidewall 14 defines a U-shaped slot to form a tongue portion 148 extending inward slantingly.

The cover 20 includes a plate 21 and a flange 22 perpendicularly extending down from a side of the plate 21. A mounting hole 222 is defined in the flange 22.

The movable member 30 includes a main plate 32, a first plate 34 and a second plate 36 extending perpendicularly from two opposite ends of the main plate 32 respectively. A locking hole 322 is defined in an upper portion of the main plate 32. The locking hole 322 includes a small part 3221 and a large part 3222 communicating with the small part 3221. Two connecting holes 324 are defined in a middle of the main plate 32. Each connecting hole 324 includes a small section 3241 and a large section 3242 communicating with the small section 3241. A through slot 326 is defined in a low portion of the main plate 32. A tab 328 extends from a sidewall bounding the through slot 326 adjacent to the second plate 36.

Figure 2:
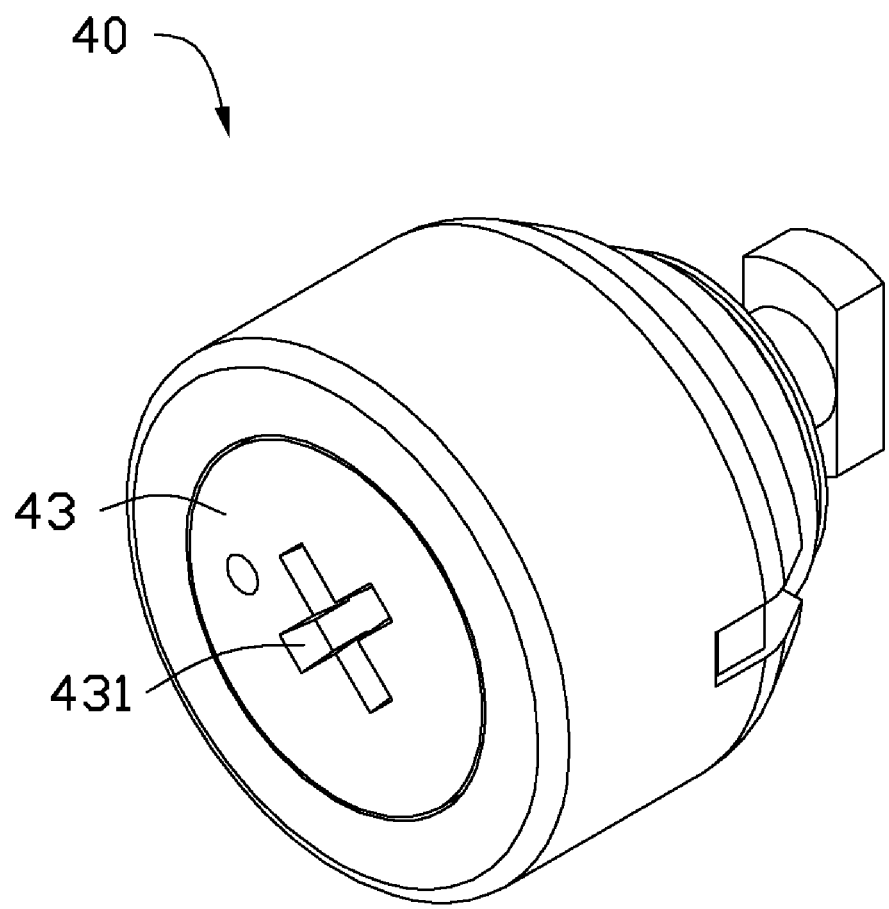
FIG. 2 is an enlarged view of the latch member of FIG. 1, but viewed from another perspective.
Figure 3:
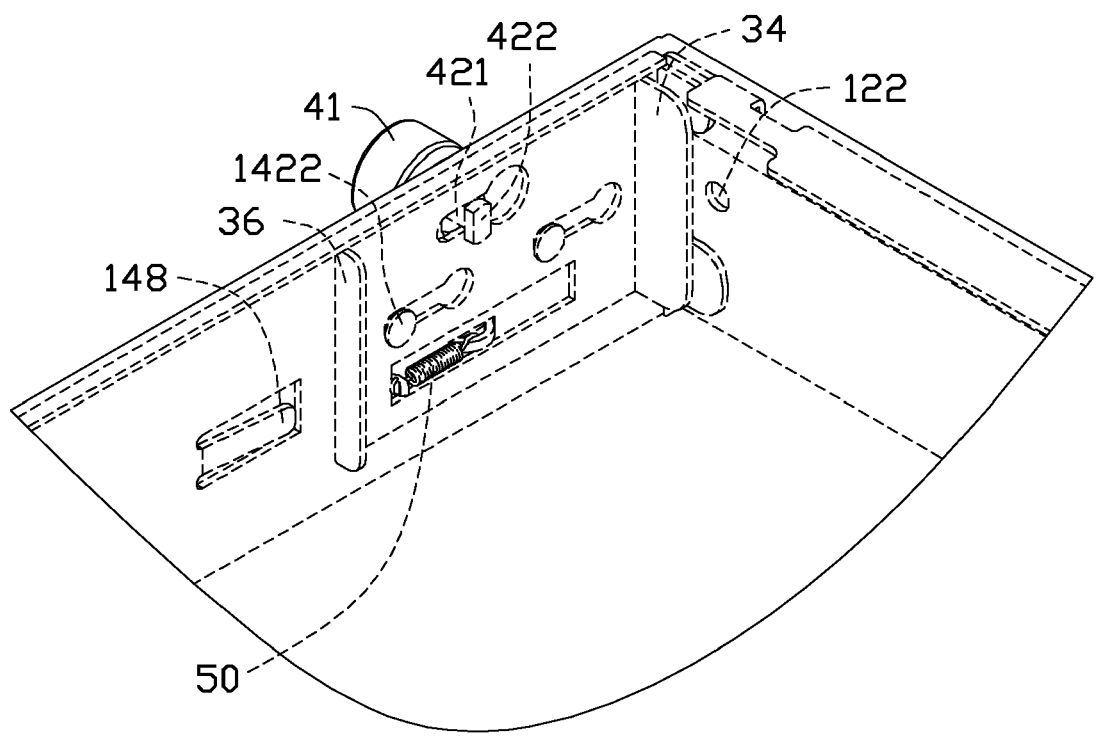
FIG. 3 and FIG. 4 are assembled, isometric views of FIG. 1, but showing different states of use.

Referring to FIG. 2, the latch member 40 includes a cannular head 41 and a shaft 43 pivotably received in the head 41. A slot 431 is defined in a first end of the shaft 43. The slot 431 may be a cross slot or a straight slot to suit a screwdriver. A T-shaped latch portion 42 is formed from a second end of the shaft 43 opposite to the slot 431. The latch portion 42 includes a rod 421 extending from the shaft 43 and a compressed block 422 formed from a distal end of the rod 421.

In the disclosure, the resilient member 50 is a tension spring.

Referring to FIG. 2, in assembly, the movable member 30 is attached to the inner surface of the second sidewall 14, the limiting portions 142 of the second sidewall 14 engage in the connecting holes 324 in the large sections 3242 respectively and then are moved to the small sections 3241. The raised portion 146 of the second sidewall 14 extends through the through slot 326. Two opposite ends of the resilient member 50 are fixed to the raised portion 146 and the tab 328 of the movable member 30 respectively. The movable member 30 is moved away from the first sidewall 12, deforming the resilient member 50, thereby aligning the large part 3222 of the locking hole 322 with the through hole 144 of the second sidewall 14. The latch portion 42 of the latch member 40 extends through the through hole 222 of the cover 20, the through hole 144 of the second sidewall 14, and the large part 3222 of the locking hole 322. The movable member 30 is then moved by the resilient member 50 in a second direction toward the first sidewall 12, until the rod 421 of the latch portion 42 engages in the small part 3221 of the locking hole 322. The block 422 of the latch portion 42 blocks two opposite sides of the small part 3221 of the locking hole 322 to lock the cover 20 to the main body 10.

Figure 4:
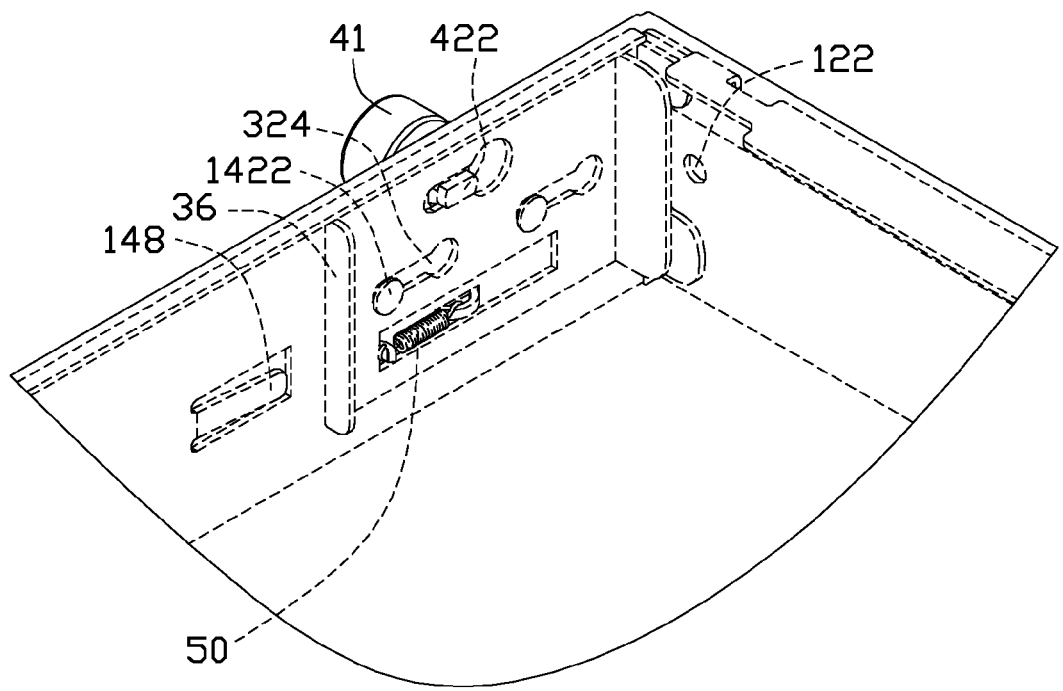

Referring to FIG. 4, to release the cover 20 from the main body 10, a screwdriver is used to operate the latch member 40 through the slot 431, to rotate the shaft 43 together with the latch portion 42. Until the block 422 of the latch portion 42 is pivoted to be parallel to the small part 3221 of the locking hole 322, the latch member 40 can be drawn out from the small part 3221 of the locking hole 322, the through hole 144 of the second sidewall 14, and the through hole 222 of the cover 20, then the cover 20 may be opened.

Figure 5:
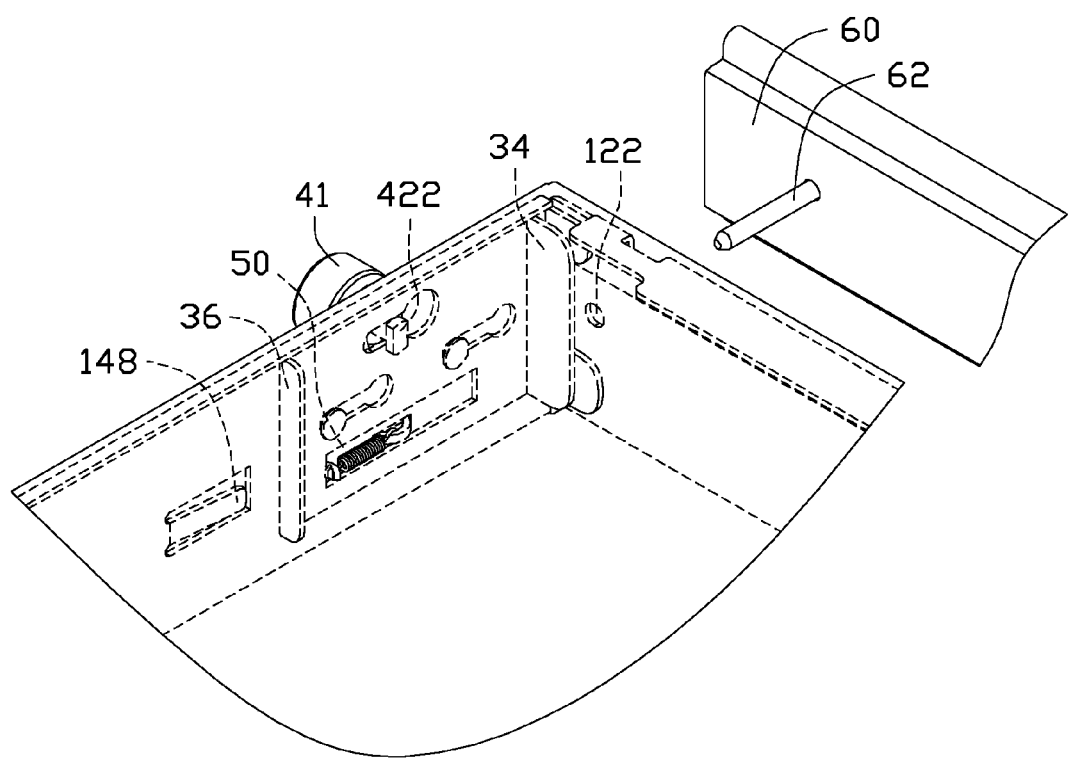
FIG. 5 is an assembled view of the enclosure of FIG. 1, together with a slide rail.
Figure 6:
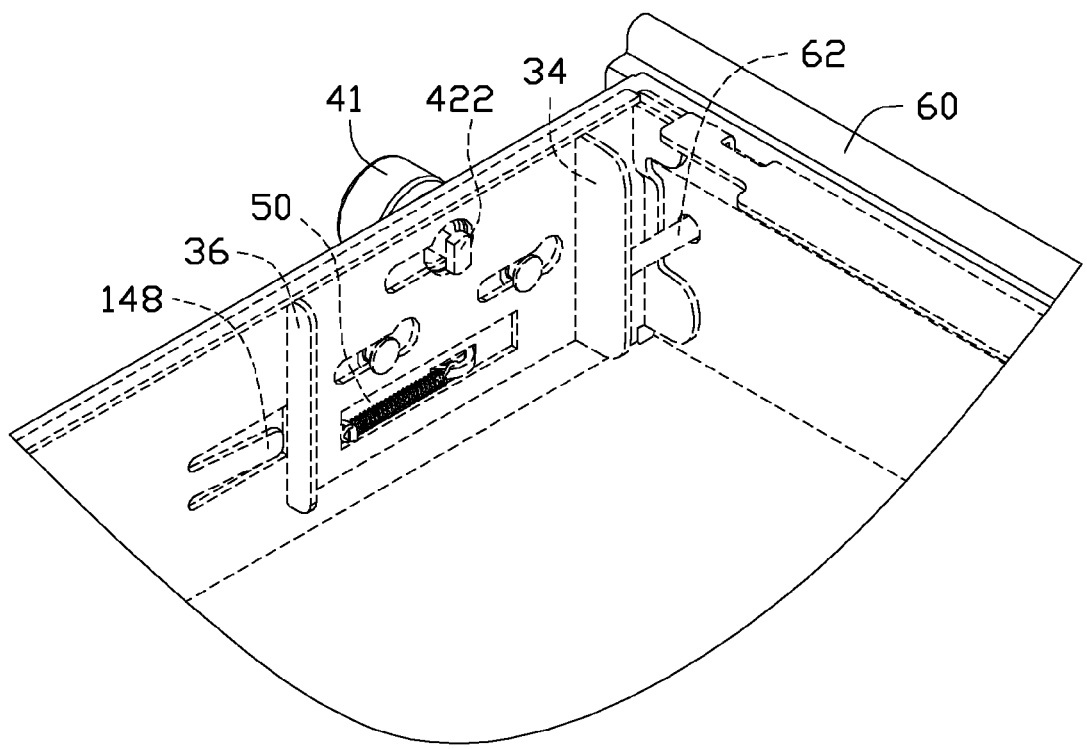
FIG. 6 is an assembled view of FIG. 5, showing a state of the slide rail mounted to the enclosure.

Referring to FIG. 5 and FIG. 6, to mount the enclosure to a cabinet (not shown in figures), a slide rail 60 is fixed to an outer surface of the first sidewall 12. A pole 62 is attached to the slide rail 60 and toward the first sidewall 12. The pole 62 extends through the through hole 122 of the first sidewall 12 to resist against the first plate 34 of the movable member 30. The movable member 30 is moved in a first direction away from the first sidewall 12 to align the large part 3222 of the locking hole 322 to the latch portion 42. In this state, if the cover 20 needs to be opened, the latch member 40 can be drawn without further use of tools.

The tongue portion 148 of the second sidewall 14 can resist against the second plate 36 to limit the movement of the movable member 30.

In the disclosure, a tool, such as a screwdriver, is needed to open the cover 20 when the enclosure is used alone or in transport. When mounting the enclosure to the slide rail 60, it is convenient to draw out the latch member 40 to open the cover 20 for repair.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An enclosure comprising:
   a main body comprising a sidewall, the sidewall defining a first through hole;
   a cover for covering the main body, the cover defining a second through hole aligning with the first through hole of the sidewall;
   a movable member movably attached to an inner surface of the sidewall, the movable member defining a locking hole, the locking hole comprising a small part and a large part communicating with the small part;
   a latch member comprising a latch portion; and
   a resilient member connected between the movable member and the sidewall of the main body;
   wherein, upon a condition that the movable member moves in a first direction to deform the resilient member, thereby aligning the large part of the locking hole with the first through hole of the sidewall, the latch portion of the latch member extends through the second through hole of the cover, the first through hole of the sidewall, and the large part of the locking hole, then the movable member is restored under bias of the resilient member to move in a second direction, until the latch portion engages in the small part of the locking hole.

2. The enclosure of claim 1, wherein the sidewall forms two substantially T-shaped limiting portions, the movable member defines two connecting holes each comprising a small section and a large section communicating with the small section, the limiting portions of the sidewall engage in the connecting holes from the large sections respectively and move to the small sections.

3. The enclosure of claim 1, wherein a raised portion extends from the inner surface of the sidewall, a through slot is defined in the movable member, a tab extends from the movable member adjacent to the through slot of the movable member, the raised portion of the sidewall extending through the through slot, two opposite ends of the resilient member are fixed to the raised portion and the tab of the movable member respectively.

4. The enclosure of claim 1, wherein the sidewall forms a tongue portion extending inward slantingly, for limiting the movable member.

5. The enclosure of claim 1, wherein the latch member comprises a cannular head and a shaft pivotably received in the head, the latch portion is formed from a first end of the shaft.

6. The enclosure of claim 5, wherein the latch portion is substantially T-shaped and comprises a rod extending from the shaft and a block formed from a distal end of the rod, the block of the latch portion blocks two opposite sides of the small part of the locking hole to lock the cover to the main body.

7. The enclosure of claim 5, wherein a slot is defined in a second end of the shaft, to suit for a screwdriver.

8. An enclosure comprising:
   a main body comprising a first sidewall and a second sidewall adjacent to the first sidewall, the first sidewall and the second sidewall each defining a through hole;
   a cover for covering the main body, the cover defining a through hole aligning with the through hole of the second sidewall;
   a movable member movably attached to an inner surface of the second sidewall, the movable member defining a locking hole, the locking hole comprising a small part and a large part communicating with the small part;
   a latch member comprising a latch portion; and
   a slide rail attached to an outer surface of the first sidewall, the slide rail comprising a pole facing the first sidewall;
   wherein the latch portion of the latch member extends through the through hole of the cover, the through hole of the second sidewall, and the large part of the locking hole, then the movable member is moved to the first sidewall, until the latch portion engages in the small part of the locking hole, thereby locking the cover to the main body; and
   wherein the pole extends through the through hole of the first sidewall to resist against the movable member, the movable member is moved away from the first sidewall to align the large part of the locking hole with the latch portion, then the latch member is readily drawn out to release the cover from the main body.

9. The enclosure of claim 8, wherein the second sidewall forms two substantially T-shaped limiting portions, the movable member defines two connecting holes each comprising a small section and a large section communicating with the small section, the limiting portions of the second sidewall engage in the connecting holes from the large sections respectively and move to the small sections.

10. The enclosure of claim 8, wherein the second sidewall defines a substantially U-shaped slot to form a tongue portion extending inward slantingly, for limiting the movable member.

11. The enclosure of claim 8, wherein the latch member comprises a cannular head and a shaft pivotably received in the head, the latch portion is formed from a first end of the shaft.

12. The enclosure of claim 11, wherein the latch portion is substantially T-shaped and comprises a rod extending from the shaft and a compressed block formed from a distal end of the rod, the block of the latch portion blocks two opposite sides of the small part of the locking hole to lock the cover to the main body.

13. The enclosure of claim 11, wherein a slot is defined in a second end of the shaft, to suit for a screwdriver.

14. The enclosure of claim 11, wherein a resilient member is connected between the movable member and the second sidewall of the main body, for biasing the movable member toward the first sidewall.

15. The enclosure of claim 14, wherein a raised portion extends from the inner surface of the second sidewall, a through slot is defined in the movable member, a tab extends from the movable member adjacent to the through slot of the movable member, the raised portion of the second sidewall extending through the through slot, two opposite ends of the resilient member are fixed to the raised portion and the tab of the movable member respectively.

* * * * *